(12) United States Patent
Rivkin et al.

(10) Patent No.: US 9,922,669 B2
(45) Date of Patent: Mar. 20, 2018

(54) METHOD OF MAKING A WRITE HEAD CORE

(71) Applicant: Seagate Technology LLC, Cupertino, CA (US)

(72) Inventors: Kirill Rivkin, Edina, MN (US); Ned Tabat, Chanhassen, MN (US); Mourad Benakli, Eden Prairie, MN (US); Michael A. Seigler, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 251 days.

(21) Appl. No.: 14/981,470

(22) Filed: Dec. 28, 2015

(65) Prior Publication Data

US 2016/0118064 A1    Apr. 28, 2016

Related U.S. Application Data

(62) Division of application No. 14/144,125, filed on Dec. 30, 2013, now Pat. No. 9,251,814.

(51) Int. Cl.
| | |
|---|---|
| G11B 5/127 | (2006.01) |
| H04R 31/00 | (2006.01) |
| G11B 5/31 | (2006.01) |
| G11B 5/00 | (2006.01) |

(52) U.S. Cl.
CPC ............ *G11B 5/1272* (2013.01); *G11B 5/312* (2013.01); *G11B 5/3116* (2013.01); *G11B 5/3163* (2013.01); *G11B 2005/0021* (2013.01); *Y10T 29/49048* (2015.01)

(58) Field of Classification Search
CPC ..... G11B 5/3116; G11B 5/312; G11B 5/3163; G11B 5/1272
See application file for complete search history.

(56) References Cited

U.S. PATENT DOCUMENTS

| | | | | |
|---|---|---|---|---|
| 7,219,415 | B2* | 5/2007 | Kakehi | G11B 5/3116 216/39 |
| 7,526,856 | B2* | 5/2009 | Nikitin | G11B 5/3116 204/192.34 |
| 7,681,303 | B2 | 3/2010 | Kondo et al. | |
| 8,164,855 | B1 | 4/2012 | Gibbons et al. | |
| 8,456,969 | B1* | 6/2013 | Mooney | G11B 5/314 369/112.27 |
| 8,541,116 | B2* | 9/2013 | Hellwig | G11B 5/746 428/827 |
| 9,019,661 | B2* | 4/2015 | Rea | G11B 5/314 360/125.32 |
| 9,047,908 | B2* | 6/2015 | Rawat | G11B 13/045 |
| 9,799,353 | B2* | 10/2017 | Cheng | G11B 5/314 |
| 2002/0034043 | A1 | 3/2002 | Okada et al. | |
| 2003/0035237 | A1 | 2/2003 | Lille | |
| 2005/0243463 | A1 | 11/2005 | Fontana, Jr. et al. | |
| 2005/0264944 | A1 | 12/2005 | Fontana, Jr. et al. | |

(Continued)

*Primary Examiner* — Paul D Kim
(74) *Attorney, Agent, or Firm* — Holzer Patel Drennan (57) ABSTRACT

Implementations disclosed and claimed herein include a method of write head core located in a slider, the write head core comprising a first end operative to serve as a write pole, a second end operative to serve as a return pole, wherein the first end comprises a substantially smaller cross-sectional area than the second end, and wherein the write head core has a substantially smooth curvature.

20 Claims, 6 Drawing Sheets

(56) References Cited

U.S. PATENT DOCUMENTS

| | | |
|---|---|---|
| 2006/0023353 A1 | 2/2006 | Lam et al. |
| 2006/0203384 A1 | 9/2006 | Maruyama et al. |
| 2007/0044297 A1 | 3/2007 | Matono et al. |
| 2008/0072418 A1 | 3/2008 | Kondo et al. |
| 2010/0321815 A1 | 12/2010 | Zhou et al. |
| 2011/0243176 A1 | 10/2011 | Mooney et al. |
| 2013/0070371 A1 | 3/2013 | Childress et al. |

\* cited by examiner

METHOD OF MAKING A WRITE HEAD CORE

CROSS-REFERENCE TO RELATED APPLICATIONS

The present application is a Divisional Application of U.S. patent application Ser. No. 14/144,125 filed Dec. 30, 2013, and titled "Write Head Core", and expected to issue on Feb. 2, 2016 as U.S. Pat. No. 9,251,814 which claims benefit of priority to U.S. Provisional Patent Application No. 61/801,364 entitled "Ultra-Compact Planar Writer" and filed on Mar. 15, 2013, both of these are specifically incorporated by reference herein for all that it discloses or teaches.

BACKGROUND

Disc drives use a write head to perform a write operation on a magnetic recording medium. In one implementation, the write head utilizes a gapped ring core structure to generate a magnetic field during operations. At the interface between the write head and the recording medium, the ring intersection forms a main pole and at least one return pole. The magnetic field allows a magnetic medium placed near the main pole to be switched from one orientation to another thereby recording ("writing") the desired digital information on the magnetic medium.

SUMMARY

Implementations described and claimed herein provide an apparatus comprising a write head core formed on a thin film wafer, wherein a longitudinal cross-section of the write head core is formed substantially parallel to a processing plane of the wafer.

Alternative implementations disclosed and claimed herein provide a write head core located in a slider, the write head core comprising a first end operative to serve as a write pole, a second end operative to serve as a return pole, wherein the first end comprises a substantially smaller cross-sectional area than the second end, and wherein the write head core has a substantially smooth curvature.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following detailed description.

BRIEF DESCRIPTION OF THE DRAWINGS

The described technology is best understood from the following Detailed Description describing various implementations read in connection with the accompanying drawings.

DETAILED DESCRIPTION

Embodiments of the present technology are disclosed herein in the context of a disc drive system. However, it should be understood that the technology is not limited to a disc drive system and could readily be applied to other technology systems as well.

In a magnetic data storage and retrieval system, a transducer head typically includes a write head core and a read head sensor. The write head core of the transducer head may include, among other things, a write pole (also referred to as the main pole), a return pole, and a coil structure. The coil structure is configured to carry a current during a write operation that generates magnetic field though the write pole that causes information to be written to a recording media located near the write pole. When a current passes through the coil structure surrounding the main pole, the resulting magnetic field causes a magnetic flux to flow through the write pole and the return pole.

Implementations disclosed herein provide write head core structures that are built from a thin film wafer. Specifically, the write head core structure is build in a plane of a thin film wafer such that smoothly curved write head core design can be created on the thin film wafer using various lithography techniques. For example, an implementation of the write head core, which does not include any sharp bends or angles and which allows highly compact geometries of the write head core. The geometry of the write head core may be defined to follow the natural flux contours resulting from the current flowing through the coil structure. As a result, when the flux direction reverses due to reversal of current flowing through the coil, faster flux reversals are achieved in the write head core. Furthermore, such configuration of substantially smoothly and compactly curved write head core also results in minimized gaps between the coil structure and the write pole, resulting in more efficient operation of the transducer head.

Figure 1:
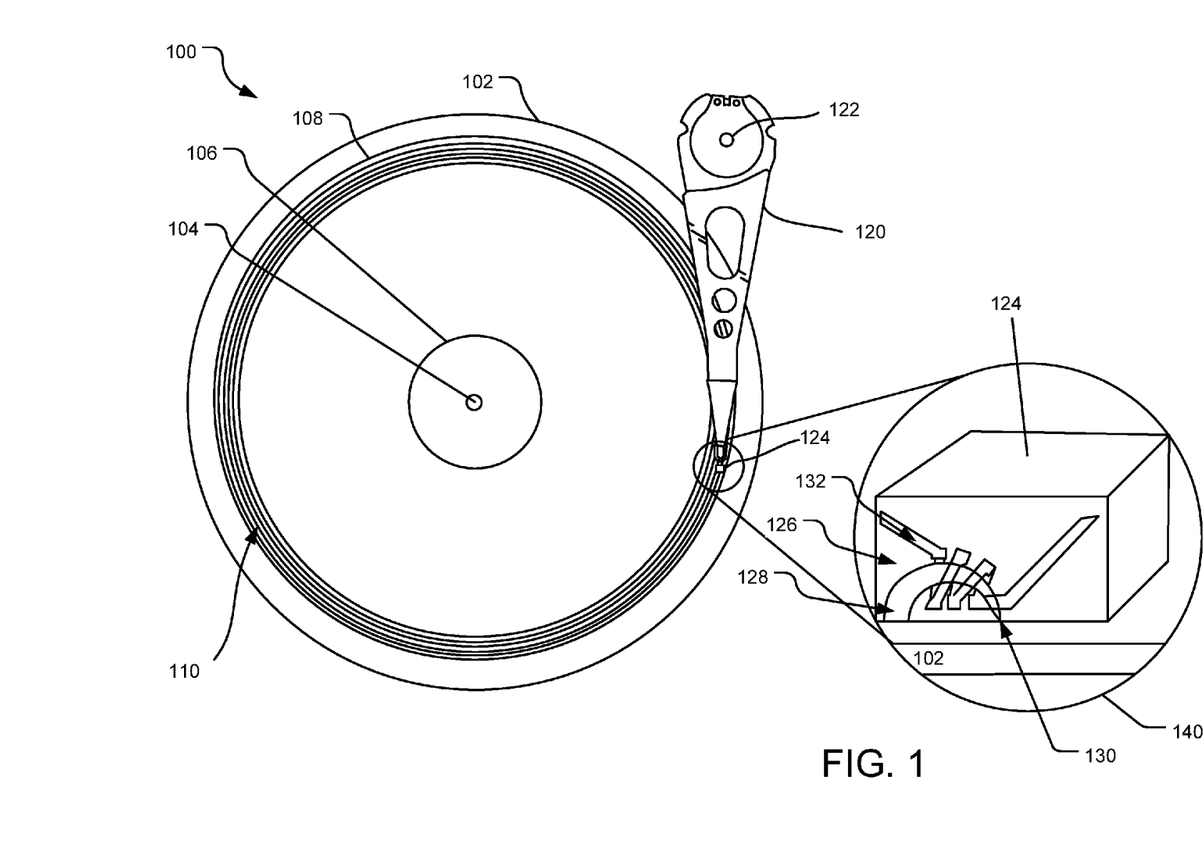
FIG. 1 illustrates an example block diagram of a disc drive system that uses a write head formed in the processing plane of a wafer.

FIG. 1 illustrates a perspective view of an example disc drive system 100. The disc drive system 100 includes a disc 102 that rotates about a spindle center or a disc axis of rotation 104 during operation. The disc 102 includes an inner diameter 106 and an outer diameter 108 between which are a number of concentric data tracks 110, illustrated by circular dashed lines.

Information may be written to and read from the data tracks 110 on the disc 102 by a transducer head 124. The transducer head 124 is mounted on an actuator assembly 120 at an end distal to an actuator axis of rotation 122. The transducer head 124 flies in close proximity above the surface of the disc 102 during disc operation. The actuator assembly 120 rotates during a seek operation about the actuator axis of rotation 122 positioned adjacent to the disc 102. The seek operation positions the transducer head 124 over a target data track of the data tracks 110.

An enlarged view 140 illustrates a close up view of parts of the transducer head 124. Specifically, the enlarged view 140 shows a write head core 126 located in the cross-track direction and above the surface of the disk 102. The write head core 126 is illustrated to have a cross section of a write core including a return pole 128 and a main pole 130. The write head core 126 is also illustrated to include a cross section of a coil structure 132 that is arranged around the write head core 126.

The write head core 126 has substantially smoothly curved surface that may generally follow the natural free-space flux contours emanating from the coil structure 132 when electrical current passes through the coil structure 132. This reduces the reluctance presented to the flux running through the main pole 130 and the return pole 128 as well as reduces formation of domain walls and vertex around the write core.

In accordance with certain embodiments, a write head core may be fabricated so that the shape of the write head is defined in the processing plane of a wafer during fabrication. Specifically, implementations disclosed herein provide a write head core including a main pole and a return pole where both the main pole and a return pole can be defined simultaneously. For example, a photo mask can be used to define the shape of the write head core. Using a photo mask to define a write head core, including both the main pole and the return pole, allows designing write head cores with optimized shapes. For example, a very smooth and compact curve can be used to form the write head core, with coils tightly wrapped around the core. Similarly, a finely tapered write head core can be formed, where the write head core tapers from the return pole to the write pole, allowing for a good static and dynamic efficiency. This can be accomplished by defining the outline of the write head core in the processing plane of the wafer that is used to fabricate the write head core.

Figure 2:
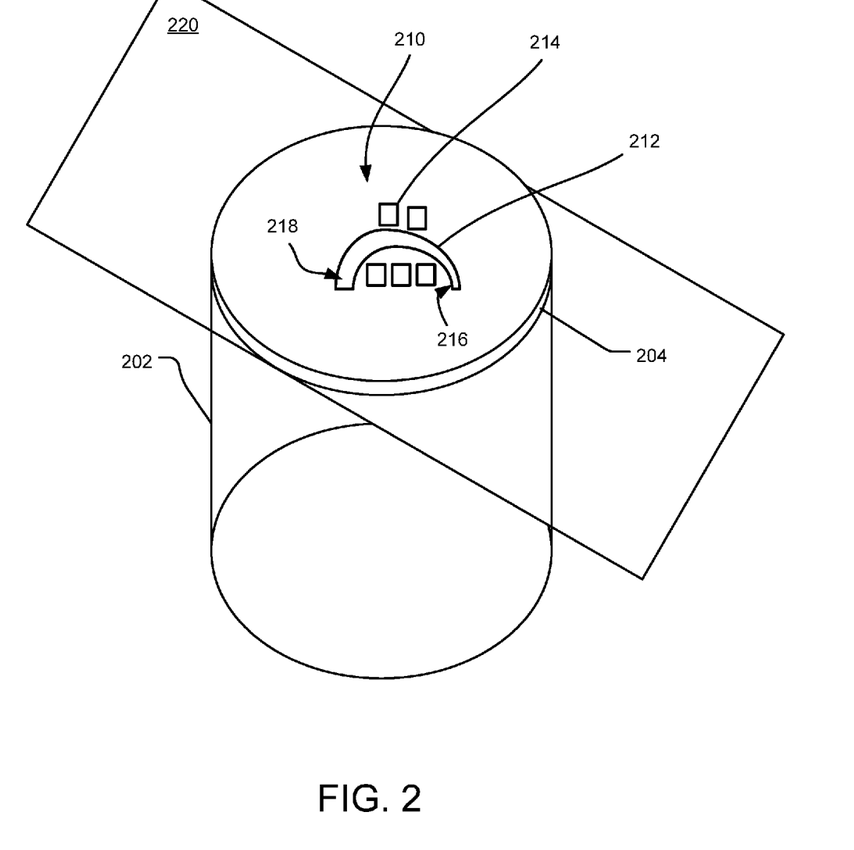
FIG. 2 illustrates an example of a cross-section of a write head core and coil that has been formed with the core shape defined in the processing plane of the wafer.

FIG. 2 illustrates an example of defining an outline of the write head core in the processing plane of a wafer. Such implementation of fabricating write head core provides a number of advantages, including compact magnetic structure with small reluctance and high efficiency, resulting in better dynamic performance for the write head core. Specifically, FIG. 2 illustrates an example of a wafer structure 202 that may be used to fabricate a write head core 210 in the form of a thin film 204. The illustrated write head core 210 includes a write core 212, including a main pole and a return pole, and a coil structure 214 (represented by the boxes).

During fabricating the write head core, the plane 220 is a plane that is co-planar with the processing plane of the wafer 204. Thus, FIG. 2 shows a longitudinal cross-section of the write core 212 and a longitudinal cross-section of the coil structure 214. The write head core 210 is formed with the core shape defined in the processing plane of the wafer. Specifically, the illustrated implementation shows the write core 212 to have substantially smoothly curving shape wherein the width of the write core 212 is tapered from the main pole end 216 to a return pole end 218. Note that while FIG. 2 illustrates only one write head core 210 being formed on the wafer structure 202, in an alternative implementation, a large number of write head core formations may be made on the wafer structure using a plurality of thin film write head core photo masks.

Figure 3:
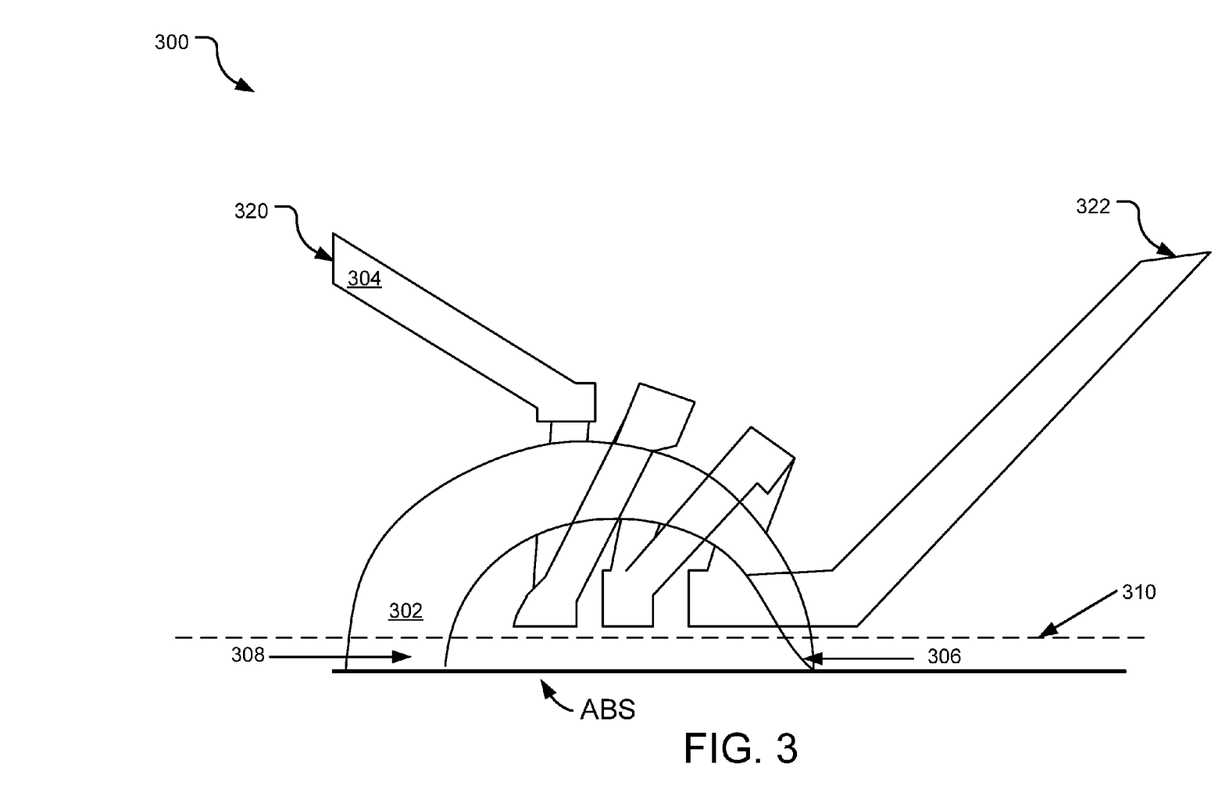
FIG. 3 illustrates an example of a write head core and coil located in the cross-track direction and above an air-bearing surface.

FIG. 3 illustrates an example cross-sectional structure of a write head core 300. The write head core 300 includes a write core 302 and a write coil 304. The write core 302 and write coil 304 are shown located in the cross-track direction and above an air-bearing surface (ABS). In this example, the write coil 304 is shown having a talon shape, because it resembles a bird's talon. The write coil 304 is shown with substantial curvature rather than having a more block-like or square appearance. Because the write coil 304 is formed in the processing plane of a wafer during fabrication, the substantial curvature of the write coil 304 can be accomplished with a simple photo mask. In one implementation, a first end 320 of the write coil 304 and a second end 322 of the write coil 304

Furthermore, the write coil 304 may be in the form of a multi-turn coil helically entwining the write core 302. The multi-turn write coil 304 could alternatively be a single coil that is located between a write pole end 306 of the write core 302 and a return pole end 308 of the write core 302. Given the curved shape of the write core 302, the write coil 304 can be placed in close proximity to the write core 302. Moreover, the write pole end 306 can be placed in close proximity to the air-bearing surface. This helps to create a very compact design for the write head core 300. A line 310 extending from the write pole 306 to the return pole 308 runs in the cross-track direction.

Figure 4:
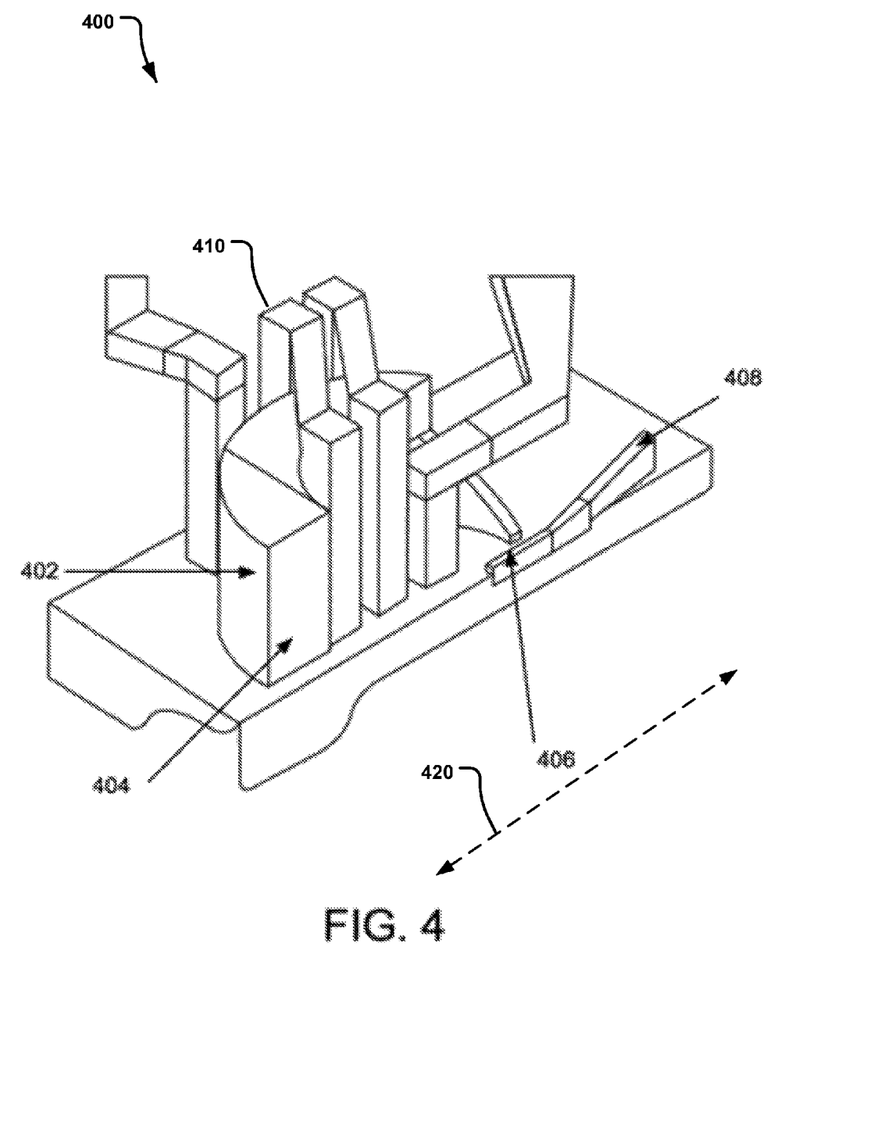
FIG. 4 illustrates another example of a write head core and coil structure disclosed herein.

FIG. 4 illustrates another example implementation of a write head core 400. Specifically, the write head core 400 is illustrated in a three dimensional form with a write head core 400 including a write core 402 and a coil structure 410. The write core 402 is shown having a wide return pole 404 and a narrower write pole 406. The write core 402 has a curved shape that resembles a clamshell. The coil structure 410 includes several loops of coils that are closely formed near the write core 402 on both sides. The return pole 404, the coil structure 410, and write pole 406 are all in close proximity to an air-bearing surface (not shown). The cross-track direction for the implementation of FIG. 4 is 420.

Also shown is a near field transducer (NFT) 408 that can be used for heat-assisted magnetic recording (HAMR). The NFT 408 can concentrate laser light from a laser mounted to a slider. The concentrated light is used to heat a portion of a magnetic recording medium in order to facilitate a write operation to the magnetic media. The implementation of the write head core 400 with the NFT may require additional space for the NFT and for the laser light to be introduced near the write pole 406. The implementation of the write head core 400 allows additional flexibility in providing such space. Furthermore, it is possible to change the curvature of the write core 402 so as to provide additional space for the NFT and to remove magnetically and optically lossy material from the path of optical path of the laser light to the NFT 408.

Figure 5:
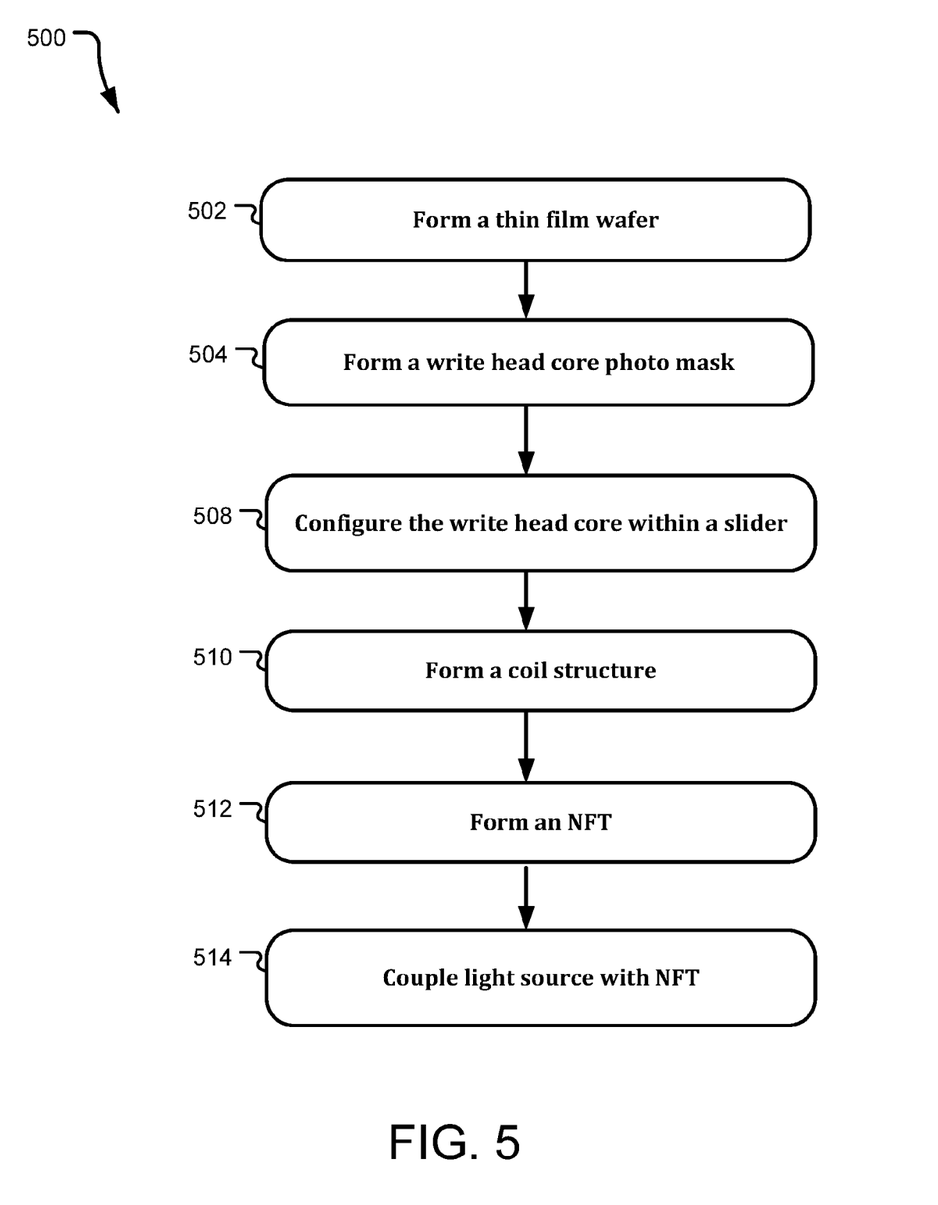
FIG. 5 illustrates another flow chart demonstrating a method of forming a write head disclosed herein.

FIG. 5 illustrates a flow chart demonstrating a method of forming a write head in accordance with certain embodiments. In operation block 502, a thin film wafer is formed. The wafer may be made from ceramic material.

An operation 504 forms a near-field transducer (NFT) near the write core head. The NFT can be used for heat-assisted magnetic recording (HAMR) so that a portion of the magnetic media near the write pole is heated before it is written to. The write head core having curved shape allows accommodating the NFT closer to the write pole, thus allowing more precise heating of the magnetic recording medium. Furthermore, the curved shape of the write head core also allows configuration of a waveguide that supplies optical or other energy to the NFT. An operation 508 couples such a light source to the NFT. For example, a laser may be used with an NFT for providing optical energy to the NFT.

At an operation 510, a write head core photo mask is formed on a thin film wafer. Note that in an alternative implementation, a plurality of write head core photo masks may be formed on the thin film wafer. In one implementation, the longitudinal cross-section of the write head core formed at operation 510 is substantially parallel to the processing plane of the thin film wafer.

Furthermore, the orientation of the write head core can be formed so that during an operation of the write head, a longitudinal cross-section of the write head core is substantially perpendicular to an air-bearing surface of the write head core. For example, when the write head core has a plane of symmetry and the longitudinal cross-section lies in that plane of symmetry, the write head core is substantially perpendicular to an air-bearing surface of the write head core. In one implementation, the write head core can be oriented so that the longitudinal cross-section of the write head core is also substantially parallel to a cross-track direction. Similarly, the write head core may also be oriented so that the longitudinal cross-section of the write head core is also substantially perpendicular to a down-track direction during operation of a transducer head.

An operation block 512 illustrates that the write head core can be configured within a slider. For example, the write head core can be configured on the slider together with a read head sensor. In one implementation, the write head core can be formed with a first end operative to serve as a write pole and a second end operative to serve as a return pole, respectively. Alternatively, the first end is fabricated to have a substantially smaller cross-sectional area than that of the second end. Thus, the width of the write head core is tapered from a wider cross-sectional area near the return pole end and a smaller cross-sectional area near the write pole area. Providing the write pole of the write head core with a narrower cross-sectional width than the cross-sectional width of the return pole results in increased flux density at the write pole end of the write head core. Such increased flux density results in efficient writing of data to the magnetic media. Furthermore, having a write pole end with a smaller cross-sectional width also allows focused writing on the magnetic media.

In one implementation, the write head core can be built by utilizing a single photo mask to define the outer contours of the write head core. Using a single photo mask allows configuring write head core having a substantially smooth curvature, which in turn results in the write head core having a shape that is substantially similar to the shape of the flux generated by the coil structure around the write head core. As a result, when the flux direction reverses due to reversal of current flowing through the coil, faster flux reversals are achieved in the write head core. Furthermore, such configuration of substantially smoothly curved write head core also results in minimized gaps between the coil structure and the write pole, resulting in more efficient operation of the transducer head.

A coil may be located between the write pole and the return pole. Thus, an operation 514 forms a multi- or single turn coil structure around the write head core. Moreover, to facilitate a compact design, the coil may be positioned proximate the air bearing surface as well as proximate to the write head core. In one implementation, the coil structure may be configured to have a bird's talon shape having ends distant from the write head core so as to connect the coil structure to a source of electrical energy. Furthermore, the middle part of the coil structure may also be configured with substantial curvature. Because the coil structure is formed in the processing plane of a wafer during fabrication, the substantial curvature of the coil structure can be accomplished with a simple photo mask.

Figure 6:
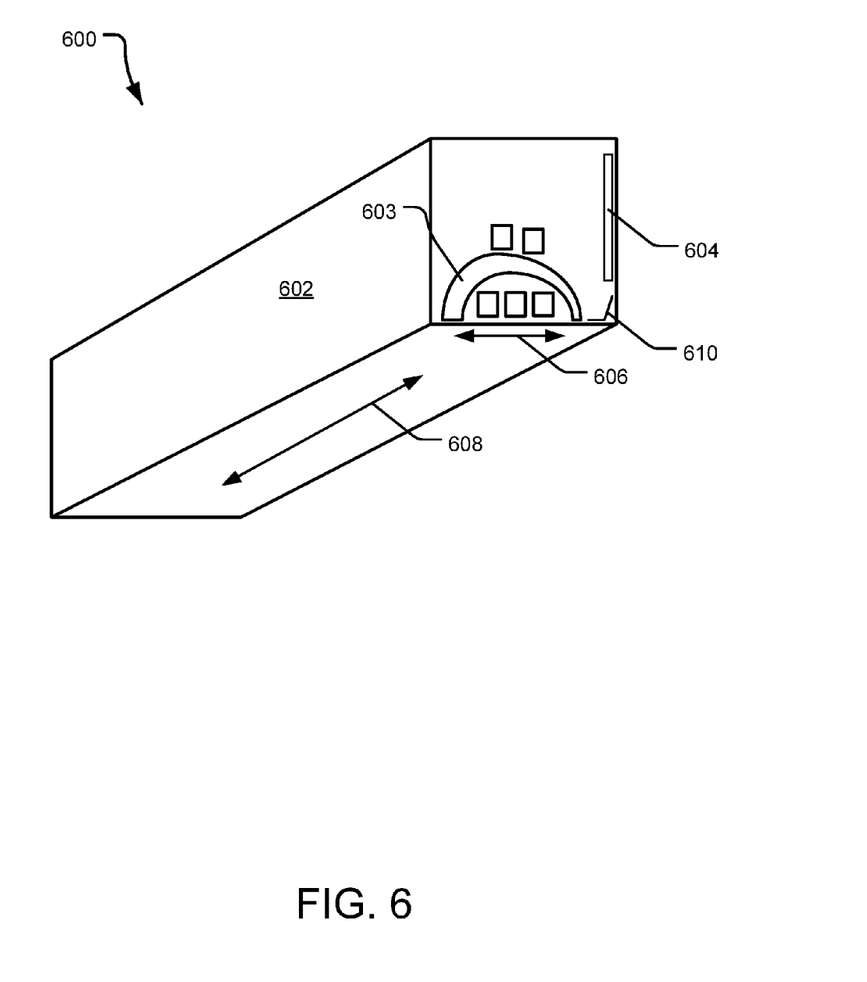
FIG. 6 illustrates an example of a slider that including a write head core disclosed herein.

FIG. 6 illustrates an example implementation 600 of a slider 602 including a write head core disclosed herein. The slider 602 may be implemented to carry a transducer head including a read head sensor (not shown) and a write head core 603 positioned proximate an end of the slider 602. The longitudinal axis of the write head core is shown oriented substantially parallel with the cross-track direction 606 and substantially perpendicular with the down-track direction 608. The slider implementation 600 also includes a light source such as a laser 604 that provides light energy to a near field transducer (NFT) 610 positioned to receive light from the light source 604. In one implementation, the write head core has a substantially curved shape and it includes a write pole that is smaller in cross-sectional width compared to the cross-sectional width of a return pole end. In such a configuration, the NFT 610 may be located to be in the vicinity of the write pole to provide heating of magnetic media near the write pole.

It is noted that many of the structures, materials, and acts recited herein can be recited as means for performing a function or step for performing a function. Therefore, it should be understood that such language is entitled to cover all such structures, materials, or acts disclosed within this specification and their equivalents, including any matter incorporated by reference.

The above specification, examples, and data provide a complete description of the structure and use of example implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. The implementations described above and other implementations are within the scope of the following claims.

What is claimed is:

1. A method comprising:
    forming a write head core located in a slider, including:
        forming a first end operative to serve as a write pole; and
        forming a second end operative to serve as a return pole, wherein the first end comprises a substantially smaller cross-sectional area than the second end, wherein the write head core is formed in a processing plane of a thin film wafer, wherein a longitudinal cross-section of the write head core is formed substantially perpendicular to an air bearing surface (ABS) of the write head core, wherein the write head core has a substantially smooth curvature; and wherein a near-field transducer is located near the write pole.

2. The method of claim 1, wherein the forming the write head core includes forming a magnetic core of a tapered shape.

3. The method of claim 1, further comprising forming a multi-turn coil located between the write pole and the return pole of the write head core, wherein the multi-turn coil has two ends extending away from the write head core.

4. The method of claim 1, wherein the forming the write head core includes configuring the shape of the write head core to substantially conform to the shape of a flux generated by a coil structure surrounding the write head core.

5. The method of claim 1, wherein the forming the write head core includes forming the longitudinal cross-section of the write head core substantially perpendicular to a down-track direction during operation of a transducer head.

6. The method of claim 5, wherein the forming the write head core includes forming the shape of the write head core is configured to concentrate magnetic flux generated by the coil structure during operation of the write head to the first end.

7. The method of claim 5, wherein the forming the write head core includes forming the coil structure is a multi-turn coil structure having a first end extending away from an ABS of the slider and a second end extending away from the ABS of the slider, the first end of the coil structure and the second end of the coil structure being away from each other along a cross-track direction of the slider.

8. The method of claim 5, wherein the forming the write head core includes forming the coil structure proximate the ABS and the write head core.

9. The method of claim 1, wherein the forming the write head core includes forming a plurality of write head core formations on the thin film wafer from a plurality of thin film write head core photo masks.

10. The method of claim 1, wherein the forming the write head core includes forming the write head core from a single photo mask on a thin film wafer.

11. The method of claim 1, wherein the wherein forming the write head core includes forming the longitudinal length of the write head core is substantially parallel to a cross-track direction of the slider.

12. The method of claim 1, further comprising forming a coil structure located between the first end and the second end of the write head core.

13. A method comprising:
forming a thin film wafer;
forming a write head core on the thin film wafer using a single photo mask, the write head core having a longitudinal cross-section substantially perpendicular to an air bearing surface and substantially parallel to a cross-track direction; and
forming a near-field transducer near the write head core.

14. The method as claimed in claim 13, wherein the forming a write head core on a thin film wafer includes configuring the write head core on the slider with a read head sensor.

15. The method as claimed in claim 13, wherein the forming the write head core comprises forming a write head core having a substantially smooth curved surface without any sharp bends.

16. The method as claimed in claim 13, further comprising configuring a multi-turn coil between a write pole and a return pole of the write head core.

17. The method as claimed in claim 13, wherein forming the write head core comprises forming a first end operative to serve as a write pole and a second end operative to serve as a return pole.

18. The method as claimed in claim 13, wherein the forming a first end operative includes forming a cross-sectional area of the first end operative substantially smaller than a cross-sectional area of the second end operative.

19. A method comprising:
forming a slider;
forming a write head core positioned proximate an end of the slider, the longitudinal axis of the write head core positioned substantially parallel with the cross-track direction and substantially perpendicular with the down-track direction; and
forming a write pole that is smaller in cross-sectional width compared to a cross-sectional width of a return pole end.

20. The method of claim 19, further comprising forming a near field transducer (NFT) located near a write pole that is smaller in cross-sectional width compared to the cross-sectional width of a return pole end and a light source positioned in the slider configured to provide light energy to the NFT.

* * * * *